April 7, 1959 — A. J. A. J. DUJARDIN — 2,880,876
APPARATUS FOR SEPARATING A LIQUID FROM
AN OVERLYING LAYER OF FOAM
Filed Sept. 27, 1955 — 5 Sheets-Sheet 4
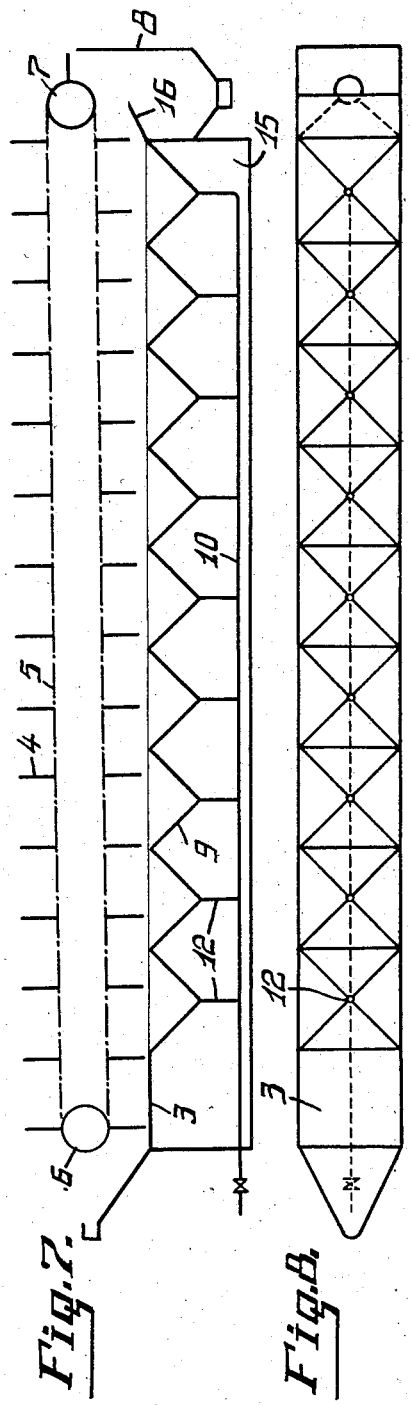
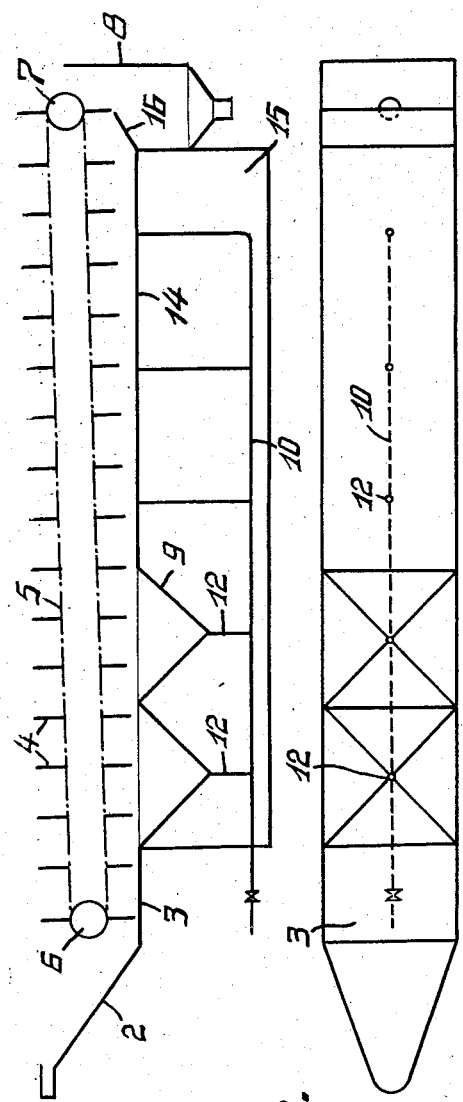
Fig. 7.  Fig. 8.  Fig. 9.  Fig. 10.
INVENTOR:
ALBERT JEAN ARMAND JULIEN DUJARDIN
By Richardson, David and Nardon
Attys INVENTOR:
ALBERT JEAN ARMAND JULIEN DUJARDIN
BY
Richardson, David and Nordon
ATTY'S

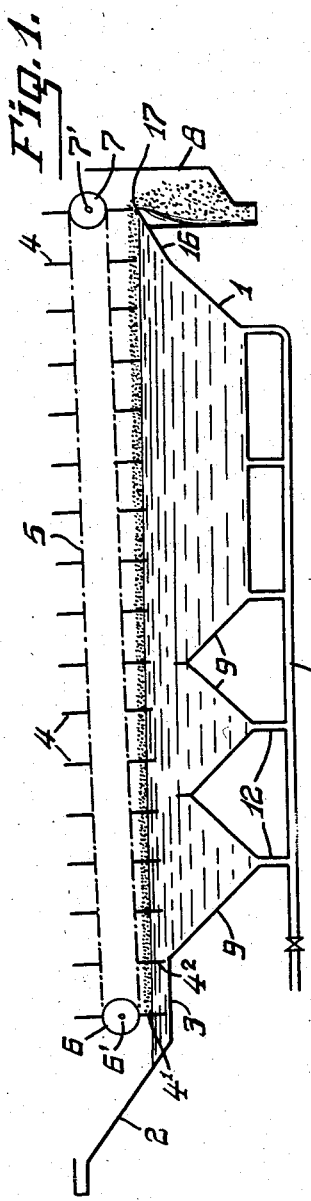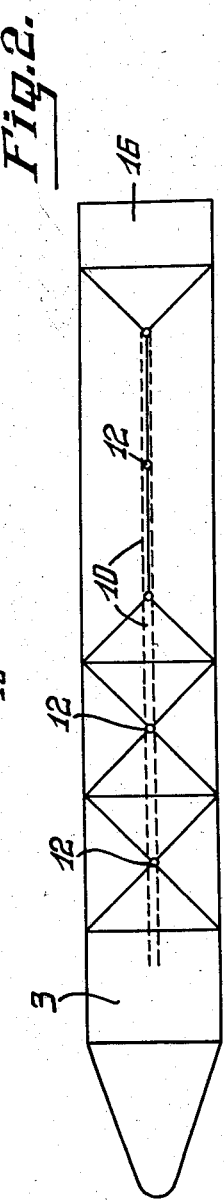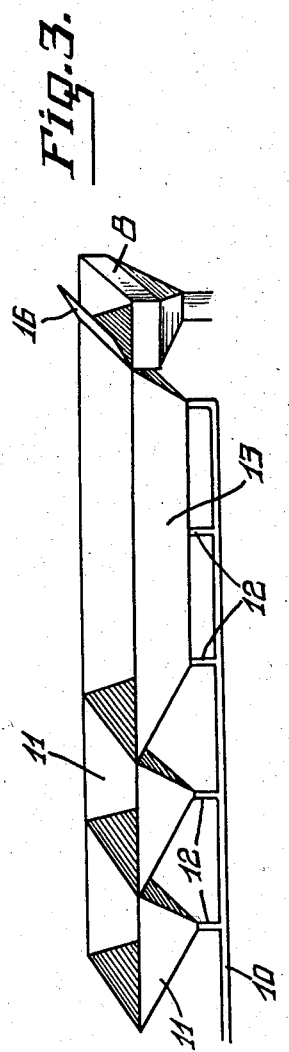

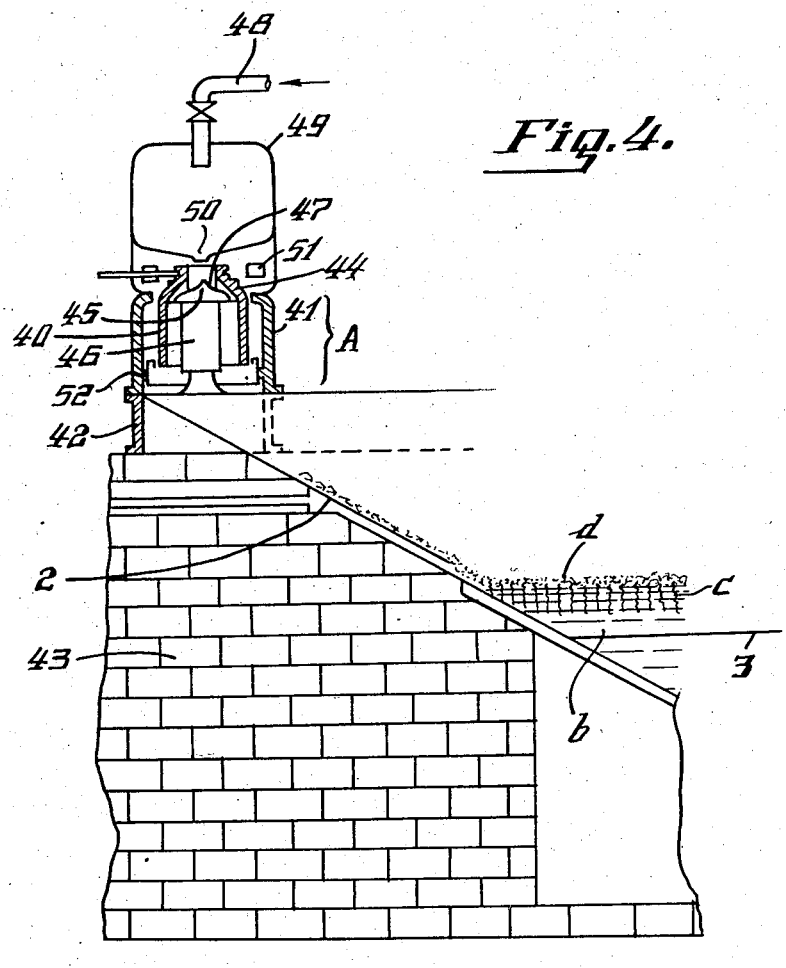

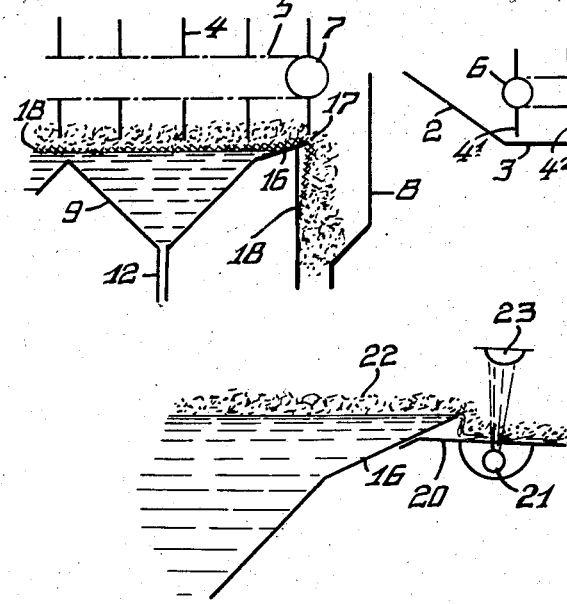
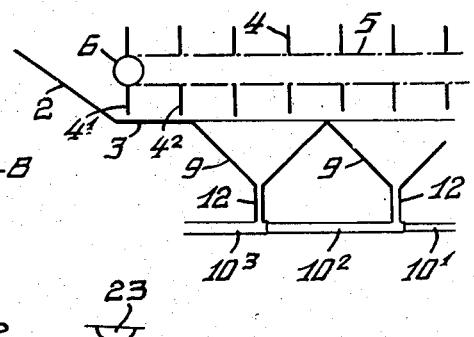
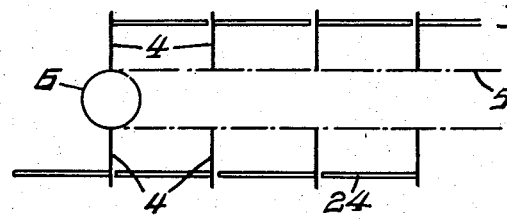
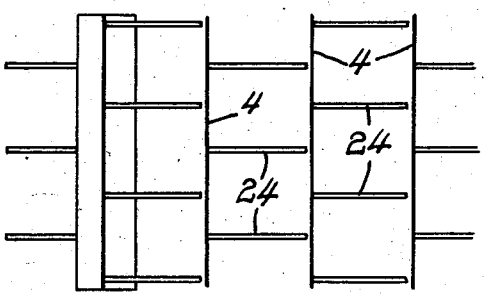

United States Patent Office 2,880,876
Patented Apr. 7, 1959

2,880,876

APPARATUS FOR SEPARATING A LIQUID FROM AN OVERLYING LAYER OF FOAM

Albert Jean Armand Julien Dujardin, Remicourt, Belgium, assignor to Ecremeuses Melotte, Societe Anonyme, Remicourt, Belgium, a Belgian company Application September 27, 1955, Serial No. 536,904

Claims priority, application Luxemburg October 2, 1954

10 Claims. (Cl. 210—523)

My present invention relates to a plant designed for use in all those cases where after any treatment a liquid covered with a foam layer is obtained and where it is required to effect a separation by decantation of these constituents and, as the case may be, likewise the elimination of sand or other materials of greater density than the liquid can contain.

This plant is primarily used for carrying out in practice the method forming the subject of the applications No. 353,778 and 445,067 of the applicant for a method for the separation of one or more constituents in suspension in a liquid.

This prior method relates to the clarification of flocculatable solutions with the aid of an electrolyte by violent dispersion, preferably in a centrifuging apparatus, the flocculatable particles and the occlusion of micro-bubbles giving way after the impact and owing to an almost instantaneous flocculation to the formation of a strongly aerated agglomerate retaining in its small channels deflocculated and accordingly clarified liquid.

In this method the liquid ionised by the addition of an electrolyte presents itself after the dispersion under the aspect of a homogeneous emulsion from which later the deflocculated and accordingly clarified liquid is separated which drains off from the spongy agglomerate of floccules-air/gas swimming eventually on top of the clear liquid.

In the majority of cases it is moreover required to eliminate from the liquid the non-flocculatable impurities which it might carry.

The invention has the object of permitting in a general way to carry out these separations in a particularly complete manner, notably in the case of a continuous treatment, and the plant is characterised in that it comprises primarily means designed to permit the uniform and continuous distribution of the emulsion over the whole width of a draining area and its conveyance in a calm state at a sufficiently slow rate for assuring as perfect as possible a draining away of the de-flocculated liquid from the foamy material, and the separate discharge of the clear liquid and the foamy material.

In general, the plant also comprises means for preventing the accumulation of sedimentary deposits such as sand, of higher density than the liquid itself, on the bottom of the appliance for the drying of the foam.

Other features of the invention will be described hereinafter with reference to an embodiment of the invention in the case of the clarification of solutions which had been subject to a treatment leading by flocculation to the formation of a strongly aerated agglomerate retaining a liquid in the enclosed small channels and swimming on top of the clear liquid (British patent specification No. 730,632).

Figure 1 is a diagrammatic longitudinal section of a draining appliance according to the invention;

Figure 2 is a plan view corresponding to Figure 1;

Figure 3 is a corresponding perspective view;

Figures 4, 5 and 6 are detail views;

Figure 14:
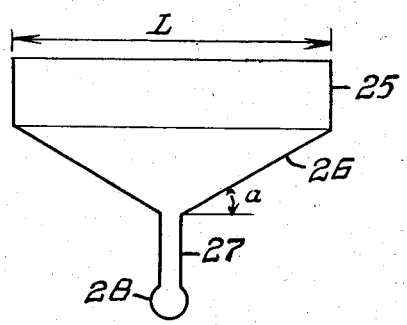
Figure 15:
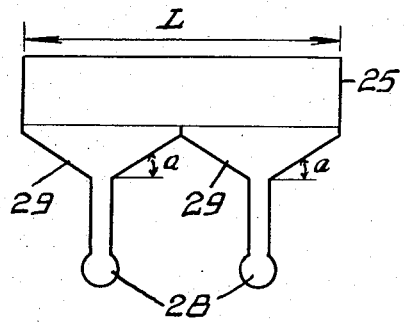
Figure 16:
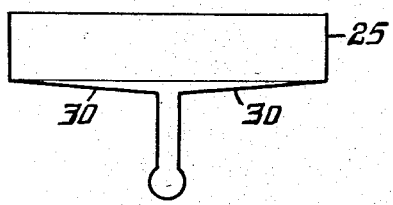
Figure 17:
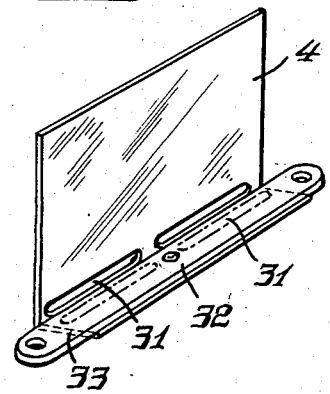
Figure 18:
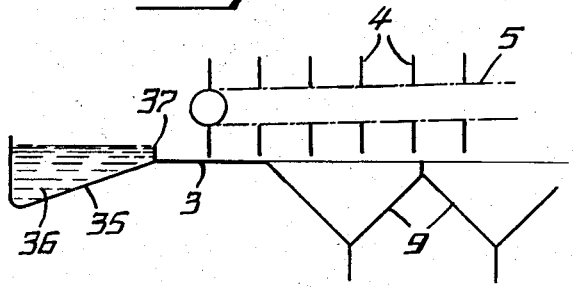

Figures 7 to 10 concern two modifications of the decanter assembly;

Figure 11 is a detail view;

Figures 12 and 13 relate to a modification of a conveyor carrying rakes provided according to the invention at the upper portion of the decantation reservoir;

Figures 14, 15 and 16 are diagrammatic cross sections relating to other modifications in the construction of the decanter;

Figures 17 and 18 are detail views.

The decanter according to the invention comprises (Figure 1) a reservoir 1 usually of rectangular shape to which the liquid to be treated and delivered from a centrifuging disperser can be supplied over an inclined plane 2.

At its entry the liquid is received on a bottom or horizontal surface 3 the part played by which will be explained hereinafter.

In principle this decanter comprises in the first place means designed to permit the uniform and continuous distribution of the homogeneous emulsion leaving the centrifuge over the entire width of the draining area and its smooth conveying at a very low speed (often in the order of 40 centimetres per minute) over the whole length of the device with the object of assuring a draining as perfect as possible of the liquid contained in the small channels from the aerated agglomerate swimming on top, and the discharging of each of the constituents.

It may comprise moreover means for preventing the accumulation on the bottom of the reservoir of non-flocculatable impurities of a density greater than that of the crude liquid, carried by the latter and separated therefrom by sedimentation, being not fixed to the agglomerate of floccules and air.

As shown in Figure 1, above the reservoir 1 there moves a conveyor in the form of an endless chain which carries scrapers 4 supported by two lateral chains 5 passing over sprocket wheels 6, 7.

An important feature is that when contemplating a plane passing through each of the axles 6' and 7' supporting the sprocket wheels 6, this plane includes an angle with the horizontal level of the liquid stored. This angle is in general very acute.

In these circumstances the scrapers dip neatly into the liquid on the arrival side of the liquid after having penetrated through the layer of foam, and emerge from the liquid halfway while at the end of their course they are neatly outside the same in such a manner that during the second part of their course and up to the end thereof they carry along merely the foam which is received in a foam drain 8.

In continuous operation the homogeneous emulsion leaving the centrifuging machine impinges on the first scraper which is the position 4' (Figure 1) which dips neatly into the liquid already stored in the reservoir, which determines the formation of a hydraulic seal causing retention of the emulsion flowing over the inclined plane 2 and which allows time for the flocculation to work out completely and for the emulsion to stabilise itself. For this purpose the horizontal surface 3 has a sufficient length, as shown in the Figures 1 and 6, for having always at least two scrapers 4' and 4² above this substantially horizontal surface, the flocculation taking place in the space included between the two first scrapers, and the emulsion being stabilised since its arrival at the level of the inclined plane 16 of the appliance for the draining or foams.

This quantity of the emulsion is subsequently carried over the decantation area where it is drained, discharging the deflocculated liquid contained in its small channels.

The rate of advance of the endless chain is calculated in such a manner that it is a function of the rate of drainage of the deflocculated liquid from the foam. It is very slow over the whole length of the appliance and will be for example in the order of 40 centimetres per minute; however, it is naturally a function of the rate of discharge flow of the deflocculated liquid from the foam.

In order to prevent the accumulation of earthy or siliceous (and accordingly non-flocculatable) deposits on the bottom of the reservoir, the solid particles are made to slide over the bottom plates 9 which include a sufficient angle with the horizontal plane to assure by gravity the sliding of these dense particles towards one or more conduits 10 for the extraction of the clarified liquid which should naturally be withdrawn continuously from the reservoir 1.

This arrangement permits, in addition to dispensing with the use of submerged mechanical members, to prevent any eddies from forming in the clear liquid, and to impart to it progressive speeds of circulation from the separation zone up to the withdrawal orifices at the entry of the conduits 12.

The draining appliance may be composed of a certain number of pans 11 (Figure 3) having a square or rectangle base and the surfaces of which are well inclined with respect to the horizontal plane so as to allow the sliding down of earth, sand and other dense bodies, this is to say towards the inverted apex of each of the pyramidal prisms where the discharge conduits 12 for the clarified liquid issue, which are connected to the pipe 10.

In Figure 4, there has been shown at A a centrifugal apparatus of the type described and claimed in U.S. Letters Patent 2,657,025 and comprising a rotary vessel or a rotary cylinder 40 which is in the interior of a stationary envelope 41 forming a base and resting by means of girders 42 on a solid foundation 43 of masonry work.

The upper portion of the rotary cylinder 40, is in the shape of a bell 44 and rests on a mushroom 45 which is provided with an axle (not shown) rotating in the interior of a tubular support 46.

Between the cylinder 40 and the mushroom 45 vanes 47 are provided which allow on the one hand to impart to the liquid the speed of the cylinder, and on the other hand to aspirate some air.

The liquid to be treated is supplied through a pipe 48 into a reservoir formed by an envelope 49 and resting on the base of the machine, and is directed towards the rotary cylinder 40 by an orifice 50 provided in a bottom and determining the rate of feed into the centrifugal apparatus. The air is aspirated through apertures 51 formed in the envelope 49.

The air and the liquid are carried along simultaneously by the vanes 47 and these two fluids spread out on the inner face of the rotary cylinder 40 and escape at the lower portion after having been stirred on the impact faces 52 as explained in U.S. 2,657,025.

The liquid resulting from this treatment is in practice a homogeneous emulsion (air-liquid) the physical characteristics of which are totally different from those of the raw liquid treated (as regards viscosity, density, conductivity of heat and electricity, etc.).

The homogeneous emulsion formed at 52 flows over the sloping plane 2 where the flocculation begins and the liquid obtained through the dispersion of the mother liquor is introduced into the decantation tank at the upper portion of the latter and above the clarified liquor b.

In the decantation tank the liquid flows as shown at c out of the aerated flocs shown at d.

The cross sections of the vertical conduits 12 are calibrated in such a manner that the liquid flows off approximately at the same rate from each prism, in order to prevent any stagnation of the liquid in one range or the other of the appliance.

These conduits may for example be calibrated by boring them to a suitable diameter or by fitting with smooth sliding fit at the entrance of these tubes a removable ring bored to a convenient diameter.

The manifold pipe 10 is substantially horizontal and has in general cross sections increasing from one length to the other from the first vertical pipe 12 situated on the side of the evacuation of the foam up to the last one in such a manner that the liquid which flows in the whole of the horizontal manifold has always a speed which makes any decantation of sand therein impossible. Owing to this, the sand and other dense bodies passed to the vertical conduits by the aid of the inclined bottom faces of the drainage appliance cannot deposit themselves in the horizontal manifold pipe 10.

Naturally a tapering pipe might be envisaged, but taking into account the total length of such a manifold pipe, such pipes do not lend themselves to commercial production or economic use.

This is the reason why in practice pipes $10^1$, $10^2$, $10^3$ (Figure 6) of increasing cross section are connected to one another from the last cell up to the first cell (Figure 6).

In view of the fact that physically the crudest and densest impurities are deposited in the first cells, and that to the extent at which the aerated agglomerate advances over the drainage area, the undesirable dense materials will be deposited in the consecutive cells, it is desirable to let the whole of the clear liquid, collecting in the horizontal pipe disposed below the cells, flow in the direction opposite to the movement of the scrapers on top. The largest and densest particles will therefore be deposited from the start of the course of the emulsion over the drainage area, and the final section of the pipe 10 will naturally be so dimensioned as to attain a velocity of flow which prevents any decantation in the horizontal manifold.

Well understood, the flow of the clarified liquid may be forced by making it pass through a pump connected in series or shunted on the horizontal manifold or manifolds 10.

The decanter may be constituted by two or more juxtaposed cells, followed by a V-shaped bottom 13 (Figures 1, 2), this assembly constituting the drainage area required.

This drainage area can be formed alternatively by the juxtaposition of any number desired of pyramidal cells 11 Figures 7 and 8) which are identical with one another and accordingly can be prefabricated in a factory, and assembled on the site.

For example one pan may be formed of twenty identical cells placed in two juxtaposed ranges of ten cells fixed to one another, but in order to double this drainage area one might use forty cells disposed in four ranges. These ranges could be superimposed if so desired.

For crude liquids which carry along primarily dense impurities of large grain size it may be possible to limit oneself to use two, four or six cells of pyramidal bottom followed by a flat bottom 14 which is horizontal or slightly inclined (Figures 9 and 10) with one or more substantially horizontal manifolds 10.

In all those embodiments, below the decantation area a closed chamber 15 (Figures 7 and 9) could be provided in which steam or any other fluid allowing the reheating of the decanted liquid, or conversely the cooling thereof, could be circulated.

As it is necessary to obviate any stagnation of the liquid in the pyramidal prisms forming the bottom of the drainage area, the pipes 12 may have different cross sections or alternatively one may provide pipes of identical cross sections into which differently bored rings are inserted.

The regulation of the discharge in each vertical pipe can also be effected by means of a member such as a flap or a butterfly valve.

At the end of the course the drained agglomerate keeps being carried along by the scrapers over a rising ramp 16 (Figures 1 and 5) in order to drop subsequently into the chute 8.

It is indispensable in fact that at this moment the foam has left the underlying clarified liquid lest the latter be carried along into said chute.

The ramp 16 bordering on the drainage area should have such an angle to the horizontal plane that no reflux movement can arise. In practice this angle will have a magnitude of about 25°.

The end 17 of this ramp has a sharp edge in order to cut the sheet of liquid neatly off at the moment when the foam is no longer under the thrust action of the scrapers.

This ramp plays moreover an additional part as follows:

In view of the fact that the appliance is designed to treat crude industrial discharges which may amount to 100 to 200 tons per hour one must not rely on an integrated output of the disperser, and on the other hand between the impact zone and the spreading out and distributing area of the decanter some slight de-aeration may occur. It will thus sometimes be noted that between the liquid phase and the solid phase of the dried agglomerate there is situated an intermediate sheet or layer of fluid constituted by a flocculate insufficiently aerated or partly de-aerated; this sheet floats on the clarified liquid, and its density is nearer to that of the clear liquid than to that of the aerated agglomerate.

The ramp 16 prevents this fluid material (reference numeral 18, Figure 5) from accumulating also in the drainage vessel; it permits by the simple carrying along owing to the thrust of the foam and to the action of the scrapers 3 to remove this undesirable fluid matter from the drainage area and to have it discharge into the sink 8 together with the foam. However, in order to facilitate complete elimination of the intermediate layer 18, one may let a very thin layer of clear liquid overflow continuously or intermittently.

The strict maintenance of the levels of overflow which assure a constant, but minimum, amount of clear liquid to be discharged over the rising ramp can be attained notably by a device having two electrodes dipping into a well appended to the drainage reservoir at a suitable level, this device controlling the electric relay of a motor-driven valve.

Other level regulators may be used such as those controlled by a photo electric cell or by one electronic device or another controlling the relay which acts on drive of a magnet- or motor-operated valve arranged at the end of the manifold pipes.

In the case of control of the liquid level of the decanter by means of a photo electric cell a transparent bottom 20 may advantageously be provided on the rising ramp below which the emitter 21 of light rays is situated. The foam 22 slides with difficulty over this secondary transparent floor, and prevents the pass of the beam of light whereas when the clear liquid washes and sweeps the visor, carrying the foam down over the secondary floor, the beam of light falls again on the photo-electric cell 23 fitted into its range. This photo-electric cell naturally controls the motor-driven valves through relays.

In certain cases it has been found advantageous (Figures 12 and 13) to replace the usual known scrapers by scrapers spaced at short intervals (8 to 10 centimetres) from one another, on the back of which are provided at equal distances small likewise equidistant spacers 24 the length of which is substantially equal to that of the interval between two consecutive scrapers.

In plan view, the scrapers and their spacers form a real chequer board pattern which imprisons and subdivides the homogeneous emulsion supplied.

All the fractions of the layer in the state of being drained are thus carried along over the entire length of the device to be eventually released in the form of cubes or parallelopipeds in the collector sink 8 of the floccules, which are aerated but deprived of the water contained formerly in the small channels, in order to be there de-aerated by means of a centrifugal pump provided in that connection which discharges a muddy paste suitable for being subsequently heated on a rotary filter with or without a previous filtering layer.

This chequer board pattern of the scraper device assures the conveying of the emulsion without shocks or ramming thrusts leaving the little channels intact which had formed spontaneously after the centrifuging treatment and the initial stabilisation.

This leads to conveying each cube of the emulsion in a sort of laboratory test tube the bottom of which is constituted by a liquid element, in the present case by the previously decanted liquid.

As shown in Figure 14, the drainage reservoir may be formed by one or more gutters 25 having two sides 26 which are inclined, converging towards a continuous gutter 27 situated substantially along the longitudinal axis of the reservoir and being in communication with a discharge conduit 28.

The sides 26 assure the sliding of the impurities of greater density than the clarified liquid.

The angle $a$ (Figure 14) of the slope of these sides ought to be calculated so as to permit the sliding.

It may happen, particularly with liquids capable of fermentation, that it is desirable to reduce the quantity of deflocculated liquid per compartment.

In this case the number of gutters is with advantage increased, noting that for a given width of the drainage area the volume of clear liquid stored in the reservoir for the clarified liquid of the drainage vessel diminished to the extent the number of gutters is increased.

Figure 15 relates to such an embodiment in which for a width L corresponding to that of the reservoir of Figure 14 two gutters 29 are provided which have the same slope $a$ as in Figure 14.

When for example there is a reservoir constituted by a single gutter the two bottom plates of which are inclined at 37°30' the volume stored is equal to the product of the triangular transverse section by the total length of the drainage area.

When a reservoir of the same width is however constituted by 2, 3, 4 . . . gutters having the same slope of 37°38' of their bottom plates the capacity of the reservoir would be equal to the product of the transverse triangular section of each component gutter by the length of the drainage area.

This will be easily realised that the more juxtaposed gutters there are for an equal width of the useful area, the less clear liquid is stored in the reservoir for the same overflow level.

Such embodiments cannot be strictly speaking prefabricated but their assembly on the site can prove as simple as that of a drainage appliance having pyramidal cells.

In the embodiments having one, two or three juxtaposed gutters the manifolds 28 for the clarified liquid, each situated at the bottom of the gutters, may have a horizontal rectangle section.

For this kind of embodiment the transportation of sand, earth and other impurities of high density can be carried out by means of an Archimedes' helix the helical pitch and rotational speed of which make sure of the discharge of the sedimentary deposits without however causing undesirable eddies.

When the liquid contains flocculatable particles only, the bottom of the reservoir may be formed by two flat or slightly inclined sections 30 ending at the longitudinal chute 27 (Figure 16).

In certain cases when it is desired to prevent any fermentation of the clarified liquid, it may be advantageous to provide the drainage device with a closed steam chamber such as shown at 15 in Figure 9.

The reheating, if any, of the clarified liquid in an appliance having juxtaposed cells or juxtaposed gutters is easier than with an appliance having a flat bottom since the heat exchange surfaces are naturally larger.

Besides, the whole drainage area can be covered by a cover, which permits the condensation of vapours and the ducting of the surplus air sucked in by the centrifuging apparatus.

This cover is advisable when very hot liquids or liquids liberating on gas or the other (HCl, H₂S, NH₃, etc.) are treated in order to keep the atmosphere of the localities housing the drainage appliance healthy.

When the scrapers have run over the drainage area and when the greater part of the aerated agglomerate has been pushed into the sink or hopper of the de-aeration pump, the scraper might remain contaminated by a small amount of the agglomerate remaining stuck or attached to them which may fermentate and give rise to hearths of infection which might spread in the fresh homogeneous emulsion with which the scrapers come into contact at the head of the drainage appliance.

In order to prevent this and to maintain the scrapers rigorously clean, the course of the scrapers might be extended beyond the drainage area, and behind the sink 8 for the agglomerate a reservoir may be arranged containing a bactericide lotion for example a lime solution of weak concentration which serves for rinsing the scrapers after their passage over said washing basin.

For reasons of encumberment, this washing basin may naturally be placed above the drainage area, placing the same between the lower level of the scrapers in action and the upper level of the scrapers out of action.

As shown in Figure 17 one may for the same purpose likewise provide lights 31 in the scrapers 4 or in the plates 32 covering the turn-up 33 arranged on the scrapers along their lower edges.

In this manner the foam or other impurities remaining adhering on the scrapers can be removed through these windows.

It is well understood that the details of the embodiments have been given by way of example only, and that numerous modifications may be conceived without departing from the scope of the invention.

Thus (Figure 18) an inclined plane 35 may be provided the slope of which is such that it rejoins the bottom 3 by a rising slope by forming a trough 36 from where the liquid may be passed to the drainage area by passing on top of a transverse ridge 37.

If desired the scrapers may be advantageously provided with rubber elements arranged on their vertical and lateral edges, designed to assure a seal with respect to the reservoir.

What I claim is:

1. Apparatus of the class described for the separation of a liquid from an overlying layer of a foamy material, said apparatus comprising a vessel into which said liquid and foamy material are introduced, said vessel defining a continuous elongated drainage area at the uppermost level of said liquid, said liquid and foamy material being introduced together into said vessel at one end of said drainage area and said foamy material being separately removed from said vessel at the other end of said area, conveyor means extending longitudinally over said drainage area and comprising a series of downwardly extending scraper elements which move continuously in a rectilinear manner at uniform speed longitudinally along said drainage area, said conveyor means being inclined with respect to the horizontal so that said scraper elements are immersed in said liquid at said one end of said drainage area and emerge therefrom to engage only said foamy material substantially midway along said area, the speed of movement of said conveyor means corresponding to the rate of separation of said liquid from said foamy material, and liquid withdrawal means communicating with the bottom of said vessel beneath said drainage area for removing said liquid therefrom.

2. Apparatus according to claim 1, in which said liquid withdrawal means comprises a series of outlets spaced longitudinally along the bottom of said vessel.

3. Apparatus according to claim 1, further comprising receiving means for said foamy material, said receiving means communicating with said vessel at said other end of said area, and an inclined ramp extending upwardly from the uppermost level of said liquid and below said scraper elements at said other end of said area for causing said foamy material to be delivered to said receiving means substantially free from said liquid.

4. Apparatus according to claim 1, in which said liquid withdrawal means comprises portions of different cross-sectional areas which communicate with different longitudinal portions of said bottom of said vessel, said cross-sectional areas being dimensioned to provide a liquid flow velocity at each portion of said withdrawal means sufficient to prevent the accumulation of sediment in said withdrawal means.

5. Liquid separation apparatus of the class described, comprising a horizontally elongated vessel, means communicating with one end of said vessel for introducing therein a mixture which subsequently flocculates to form a buoyant foamy layer overlying a clarified liquid, means at said one end of said vessel defining a shallow zone of uniform depth into which said mixture is introduced, means at the other end of said vessel defining a ramp up which said foamy layer may move for removal from said vessel, means included in said vessel and disposed intermediate said shallow zone and said ramp, said last-named means defining a deep zone and conveyor means extending longitudinally of said vessel over said shallow zone, said deep zone and said ramp, said conveyor means comprising a series of spaced depending scraper elements which extend substantially to the bottom of said shallow zone, said conveyor means being inclined with respect to the horizontal so that said scraper elements are immersed in said liquid at said one end of said vessel and as they are moved toward said ramp, each element emerges from said liquid within said deep zone for conveying only said foamy material from said deep zone to said ramp and up said ramp to leave said vessel, said shallow zone extending in the direction of movement of said conveyor means for a distance sufficient to receive at least two of said scraper elements simultaneously therein, said two scraper elements forming a chamber wherein said mixture is confined and in which said mixture flocculates during said slow movement of said elements from said shallow zone toward said ramp.

6. Liquid separation apparatus of the class described, comprising a horizontally elongated vessel, means communicating with one end of said vessel and including a sloping delivery surface for gently introducing therein a mixture which subsequently flocculates to form a buoyant foamy layer overlying a clarified liquid, means at said one end of said vessel defining a shallow zone of uniform depth into which said mixture is introduced, means at the other end of said vessel defining a ramp up which said foamy layer may move for removal from said vessel, means included in said vessel and disposed intermediate said shallow zone and said ramp, said last-named means defining a deep zone, and conveyor means extending longitudinally of said vessel over said shallow zone, said deep zone and said ramp, said conveyor means comprising a series of spaced depending scraper elements each of which is dimensioned to extend substantially to the bottom of said shallow zone and to move therefrom slowly toward said ramp, said conveyor means being inclined with respect to the horizontal so that said scraper elements are immersed in said liquid at said one end of said vessel and emerge successively from said liquid at a location disposed within said deep zone for conveying only said foamy material from said deep zone to said ramp, the speed of movement of said conveyor means being adapted to correspond to the rate of formation of said foam, said shallow zone extending in the direction of movement of said conveyor means for a distance at least sufficient to receive two adjacent zones of said scraper elements simultaneously therein, said vessel having spaced parallel side walls which cooperate with said adjacent scraper elements to define a moving chamber wherein said mixture is initially confined and in which said flocculation proceeds.

7. Apparatus according to claim 6, further comprising outlet means communicating with the interior of said vessel within said deep zone and below the level of said clarified liquid for withdrawing said clarified liquid therefrom.

8. Liquid separation apparatus of the class described, comprising a horizontally elongated vessel, means communicating with one end of said vessel and including a sloping delivery surface for introducing therein a mixture which subsequently flocculates to form a buoyant foamy layer overlying a clarified liquid, said delivery surface introducing said mixture into vessel at the uppermost level of material already standing therein, means communicating with the lower end of said delivery surface and defining a shallow zone of uniform depth into which said mixture is introduced, means at the other end of said vessel defining a ramp up which said foamy layer may move for removal from said vessel, means included in said vessel and disposed intermediate said shallow zone and said ramp, said last-named means defining a deep zone, and conveyor means extending longitudinally of said vessel substantially throughout its entire length, said conveyor means comprising a series of depending scraper elements which extend substantially to the bottom of said shallow zone and which move slowly toward said ramp, said conveyor means being inclined with respect to the horizontal so that said scraper elements are immersed in said liquid at said one end of said drainage area and emerge successively from said liquid within said deep zone for conveying only said foamy material from said deep zone to said ramp and up said ramp out of said vessel with the speed of movement of said conveyor means corresponding to the rate of separation of the clarified liquid from the foamy layer, and liquid withdrawal means communicating with said deep zone below the level of said clarified liquid.

9. A liquid clarification plant comprising emulsifying means for producing a flow of homogeneous emulsion comprising a colloidal suspension of solids in the liquid to be clarified with air in the form of microscopic bubbles dispersed throughout said suspension, said emulsion, upon standing, flocculating to form a buoyant foamy layer overlying the clarified liquid, a horizontally elongated vessel defining a drainage area, means at one end of said vessel defining a shallow zone of uniform depth, a sloping delivery surface inclined downwardly toward said shallow zone for flowing said emulsion gently into said one end of said vessel, means at the other end of said vessel defining a ramp, means included in said vessel and disposed intermediate said shallow zone and said ramp, said last-named means defining a deep zone, conveyor means extending longitudinally of said vessel over said shallow zone, said deep zone and said ramp and comprising a series of depending scraper elements which extend substantially to the bottom of said shallow zone and move slowly toward said ramp, said shallow zone extending in the direction of movement of said conveyor means for a distance sufficient to receive at least two adjacent scraper elements simultaneously therein whereby at least one scraper element is always interposed between said sloping delivery surface and said deep zone with the space between the two scraper elements constituting a moving space in which said emulsion is initially confined for movement to said deep zone, said conveyor means being inclined with respect to the horizontal so that said scraper elements are immersed in said liquid at one end of said drainage area and emerge successively therefrom to convey only said foamy material from said deep zone to said ramp and up said ramp out of said vessel, the speed of movement of said conveyor means corresponding to the rate of drainage of the clarified liquid from the foam, and withdrawal means communicating with the bottom of said deep zone.

10. Liquid separation apparatus of the class described, comprising a horizontally elongated vessel, means communicating with one end of said vessel for introducing therein a mixture which subsequently flocculates to form a buoyant foamy layer overlying a clarified liquid, means at said one end of said vessel defining a shallow zone of uniform depth into which said mixture is introduced, means at the other end of said vessel defining a ramp up which said foamy layer may move for removal from said vessel, means included in said vessel and disposed intermediate said shallow zone and said ramp, said last-named means defining a deep zone, conveyor means extending longitudinally of said vessel over said shallow zone, said deep zone and said ramp, said conveyor means comprising a series of depending conveyor elements which extend substantially to the bottom of said shallow zone and which move slowly toward said ramp, said conveyor elements emerging from said liquid within said deep zone for conveying only said foamy material from said deep zone to said ramp and up said ramp out of said vessel, and liquid withdrawal means communicating with said deep zone, whereby said mixture may flocculate and become stabilized in said shallow zone before traversing said deep zone, said conveyor means including spacer elements extending longitudinally between adjacent ones of said conveyor elements.

References Cited in the file of this patent
UNITED STATES PATENTS

| | | |
|---|---|---|
| 1,207,978 | Moore | Dec. 12, 1916 |
| 1,301,532 | Allen | Apr. 22, 1919 |
| 2,119,013 | Kerns | May 31, 1938 |
| 2,746,605 | Baum | May 22, 1956 |
| 2,765,919 | Juell | Oct. 9, 1956 |
| 2,813,074 | Banks et al. | Nov. 12, 1957 |